United States Patent [19]

Gates et al.

[11] Patent Number: 4,933,694
[45] Date of Patent: Jun. 12, 1990

[54] CAMERA VIEW FINDER

[75] Inventors: Richard A. Gates; Jeffrey R. Stoneham, both of Rochester, N.Y.

[73] Assignee: Eastman Kodak Company, Rochester, N.Y.

[21] Appl. No.: 255,187

[22] Filed: Oct. 7, 1988

[51] Int. Cl.⁵ .................. G03B 13/10; G03B 15/04
[52] U.S. Cl. .................................... 354/222; 350/422
[58] Field of Search ............... 354/199, 200, 201, 219, 354/221, 222, 223, 224, 225, 195.12; 350/422

[56] References Cited

U.S. PATENT DOCUMENTS

| | | | |
|---|---|---|---|
| 2,187,246 | 1/1940 | Nerwin | 354/195.12 |
| 2,653,528 | 9/1953 | Mueller | 354/221 |
| 3,212,422 | 10/1965 | Nerwin et al. | 354/222 |
| 3,490,844 | 1/1970 | Sapp, Jr. | 355/40 |
| 3,836,934 | 9/1974 | Suzuki et al. | 354/195.12 |
| 3,936,150 | 2/1976 | Ikeda | 350/422 |
| 4,038,673 | 7/1977 | Schroder | 354/222 |
| 4,104,663 | 8/1978 | Yamazaki et al. | 354/195.12 |
| 4,195,924 | 4/1980 | Stemme et al. | 354/195.12 |
| 4,204,760 | 5/1980 | Kobayashi | 354/195.12 |
| 4,256,396 | 3/1981 | Kawaguchi et al. | 354/222 |
| 4,277,158 | 7/1981 | Zawodny | 354/195.12 |
| 4,357,102 | 11/1982 | Taren et al. | 355/77 |

Primary Examiner—A. A. Mathews
Attorney, Agent, or Firm—James A. Smith

[57] ABSTRACT

A camera view finder comprises three separate lenses for producing images corresponding to desired pseudo effects. The lenses are mounted in parallel frames which are supported for rectilinear movement. A cam means is provided to selectively position the frames into a viewing position.

5 Claims, 4 Drawing Sheets

CAMERA VIEW FINDER

CROSS-REFERENCE TO RELATED APPLICATIONS

Reference is made to commonly assigned copending application U.S. Ser. No. 255,091, entitled CAMERA VIEW FINDER and filed Oct. 7, 1988 in the name of Richard A. Gates, now abandoned.

BACKGROUND OF THE INVENTION

The present invention relates to view finder devices for use in cameras and more particularly to an improved view finder device in which a plurality of lenses can be selectively positioned in a viewing position.

Mechanisms are known which change the magnification of a view finder in cameras having more than one photographic lens and in cameras for producing special effects such as pseudo tele or pseudo pan. However, in general, such mechanisms are complicated and capable of providing only two levels of magnification.

In copending application Ser. No. 255,091 referenced above, a view finder is disclosed which comprises three lenses mounted for pivotal movement about three separate axis respectively. Cam means are provided for moving the respective lenses between a common viewing position and separate folded positions.

SUMMARY OF THE INVENTION

In accordance with the invention, a camera view finder comprises three separate lenses. The lenses are mounted in parallel frames respectively which are supported for rectilinear movement. A cam means is provided to selectively position the frames into a viewing position.

BRIEF DESCRIPTION OF THE DRAWINGS

Other objects and advantages of the invention will become apparent from the following description taken in connection with the accompanying drawings wherein.

DETAILED DESCRIPTION OF THE PREFERRED EMBODIMENT

Figure 1:
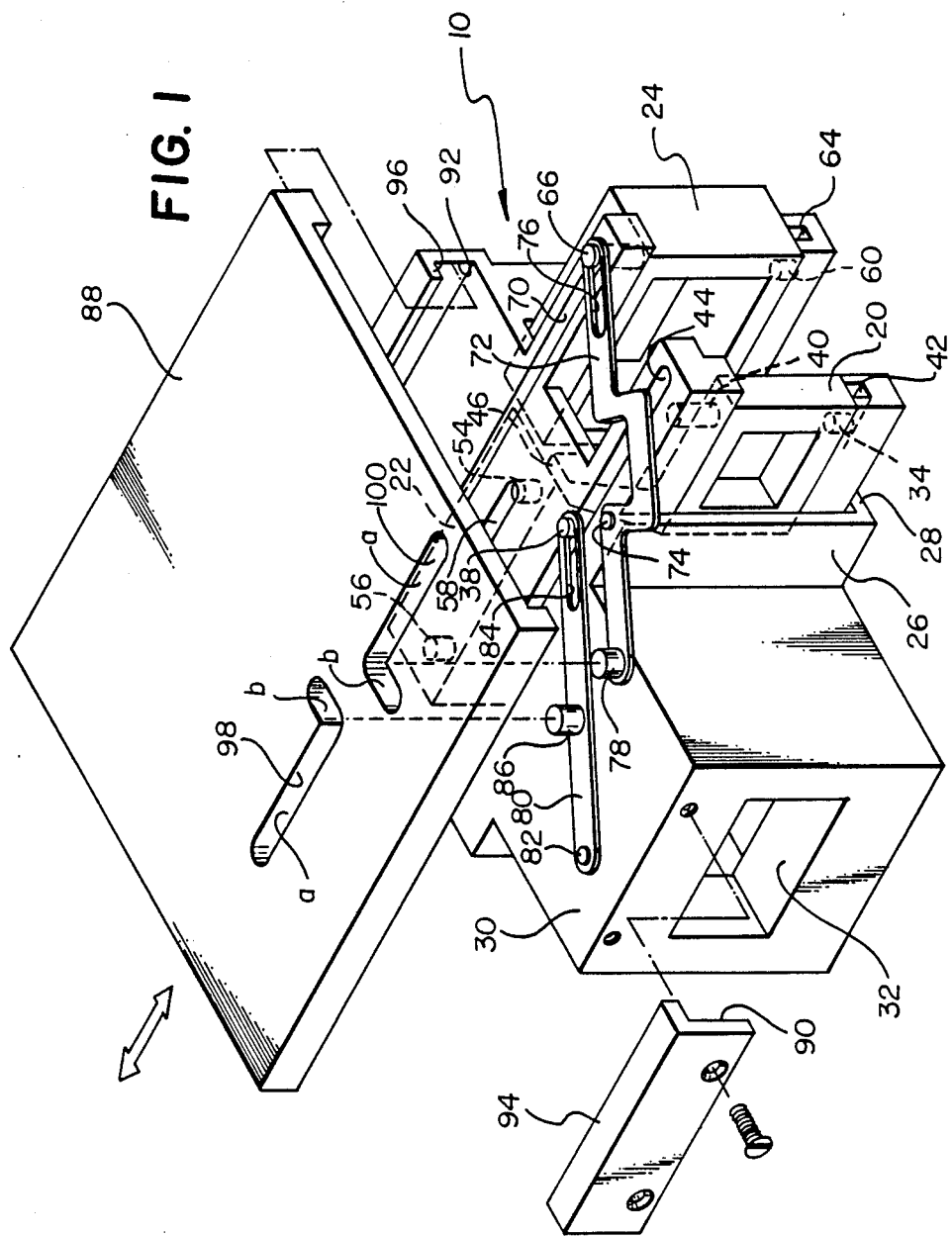
FIG. 1 is a partially exploded perspective view of a view finder device in accordance with the invention.

Referring to the drawings, there is shown a view finder device for a photographic camera. To simplify the disclosure, camera parts not necessary for an understanding of the invention have been omitted. For example, the eye lens and front element are not shown and the disclosure is limited to apparatus for moving the movable lens element.

Referring to FIG. 1 of the drawings, there is shown a view finder 10 comprising three lenses (tele, pan and normal) mounted in frames 20, 22 and 24 respectively. Each of the frames 20, 22 and 24 are of rectangular configuration and mounted for rectilinear movement in a supporting structure 26.

The supporting structure 26 which would be part of a camera housing (not shown) comprises a bottom supporting plate 28 and a box-like structure 30 formed on one end of the plate 28. A viewing window 32 framed in the structure defines a viewing axis (v) with which the lens frames 20, 22 and 24 are selectively aligned.

The lens frame 20 (tele) is mounted for rectilinear sliding movement in supporting structure 26. The bottom segment of the frame is provided with a pair of spaced pins 34 (one of which is visible in FIG. 1) and the upper segment is provided with a pair of spaced pins 38 and 40. The bottom pins are positioned in a bottom track 42 and the upper pins are received in an upper track 44. Both tracks comprise slots formed in rails extending from surfaces of supporting structure 26. The upper pin 38 extends beyond the upper end of track 44 to serve as a caming pin as will later be described. A flange 46 extending perpendicular from the left end of frame 20 functions as a cam for displacing frame 22 as will be described below.

Frame 22 (pan) similar to frame 20 includes a pair of bottom pins (not shown) received by a lower track (not shown) and a pair of upper pins 54 and 56 received by a track 58. A spring 59 connected between the right end of frame 22 and a fixed surface of structure 26 serves to bias frame 22 to the right.

Frame 24 (normal) similarly comprises a pair of lower pins 60 received by a track 64 and a pair of upper pins 66 and 68 received by an upper track 70. The pin 66 extends above the end of track 70 and functions as a cam pin as will be described below. The frame 24 is supported to engage and displace frame 22 to the left against the bias of spring 59 as discussed below.

The three frames are thus mounted for rectilinear movement in respective parallel planes by means of the described pins and tracks. The cam means for positioning the frames includes a pivotal lever 72 supported by a pivot pin 74 fixed to housing 26 adjacent to slot 44. The lever 72 has an elongated slot 76 in one end which receives pin 66 of frame 24 and has a cam pin 78 extending outward from its opposite end.

A second pivotal lever 80 is pivotally mounted at one end of the upper wall of structure 30 by means of a pin 82 and has a slot 84 in its opposite end which receives cam pin 38 of frame 20. A cam pin 86 extends upward from the central portion of lever 80.

The cam means further includes a plate 88 slideably mounted for rectilinear movement on the structure 26. The plate 88 is received in slots 90 and 92 defined by respective guides 94 and 96 attached to the structure 26. The plate 88 is movable rectilinearly relative to the structure 26 in the direction indicated.

The plate 88 is provided with two cam slots 98 and 100 for positioning the frames 20, 22 and 24. Each slot includes a elongated straight portion (a) and a cam portion (b) extending at right angles to portion (a). The slot 98 receives cam pin 86 of lever 80 and slot 100 receives cam pin 78 of lever 72.

Figure 2:
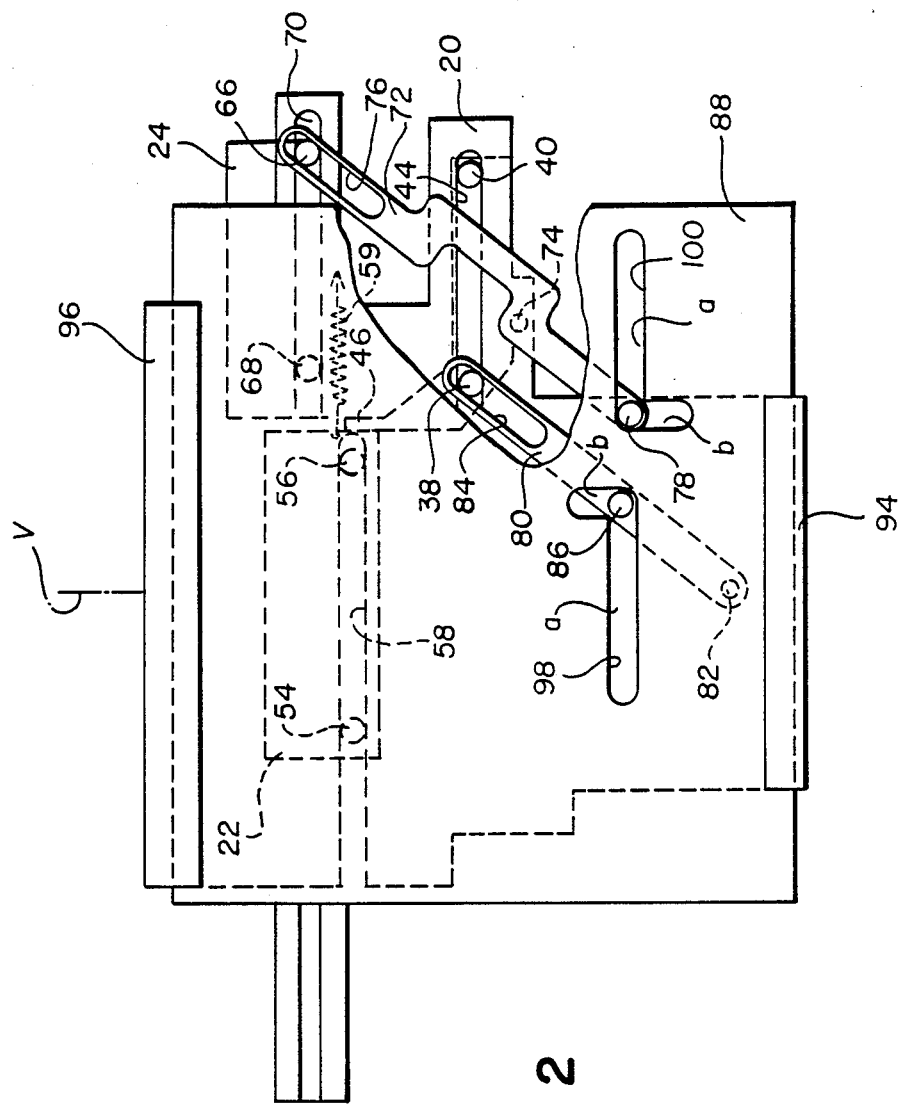
FIGS. 2, 3 and 4 are plan views of the apparatus shown in FIG. 1 showing the parts in three different positions.

In operation, the parts will assume the positions shown in FIGS. 1 and 2 when the pan lens frame 22 is aligned with the viewing window 32. In this condition, frames 20 and 24 will be displaced to the right of the viewing axis as shown and pins 38 and 66 will be near the ends of their respective slots 84 and 76.

Figure 3:
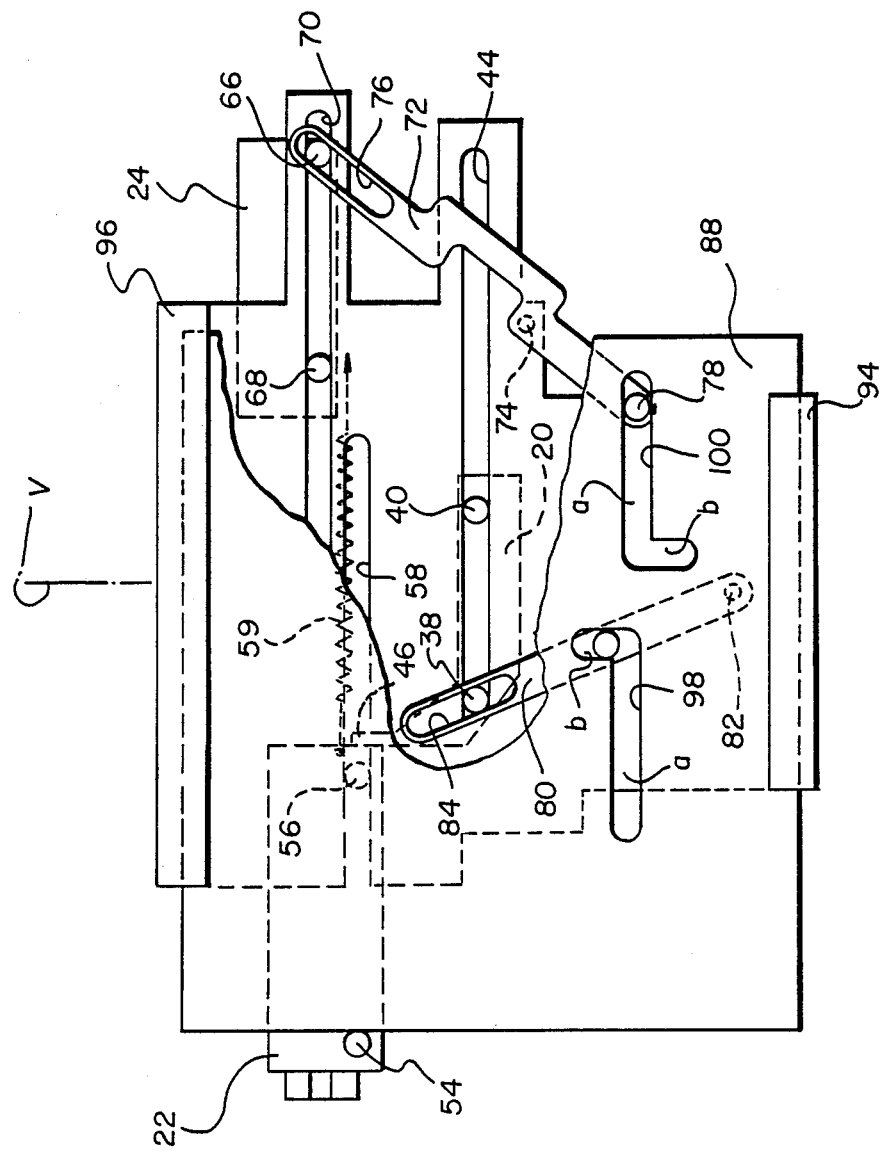

If plate 88 is moved to the left from the central position shown in FIGS. 1 and 2 to the position shown in FIG. 3, pin 86 will be displaced into the cam portion (b) of slot 98 and lever 80 will be pivoted counterclockwise causing pin 38 to displace frame 20 to the left into the viewing position. The flange 46 will engage frame 22 and move it out at the viewing position against the bias of spring 59. Pin 78 will ride in the straight portion (a) of slot 100 and no movement of frame 24 will occur.

If the plate 88 is returned from the position shown in FIGS. 1 and 2 from the position shown in FIG. 3, the parts will move in the opposite direction. In this case, spring 59 will position frame 22 back into the viewing position.

Figure 4:
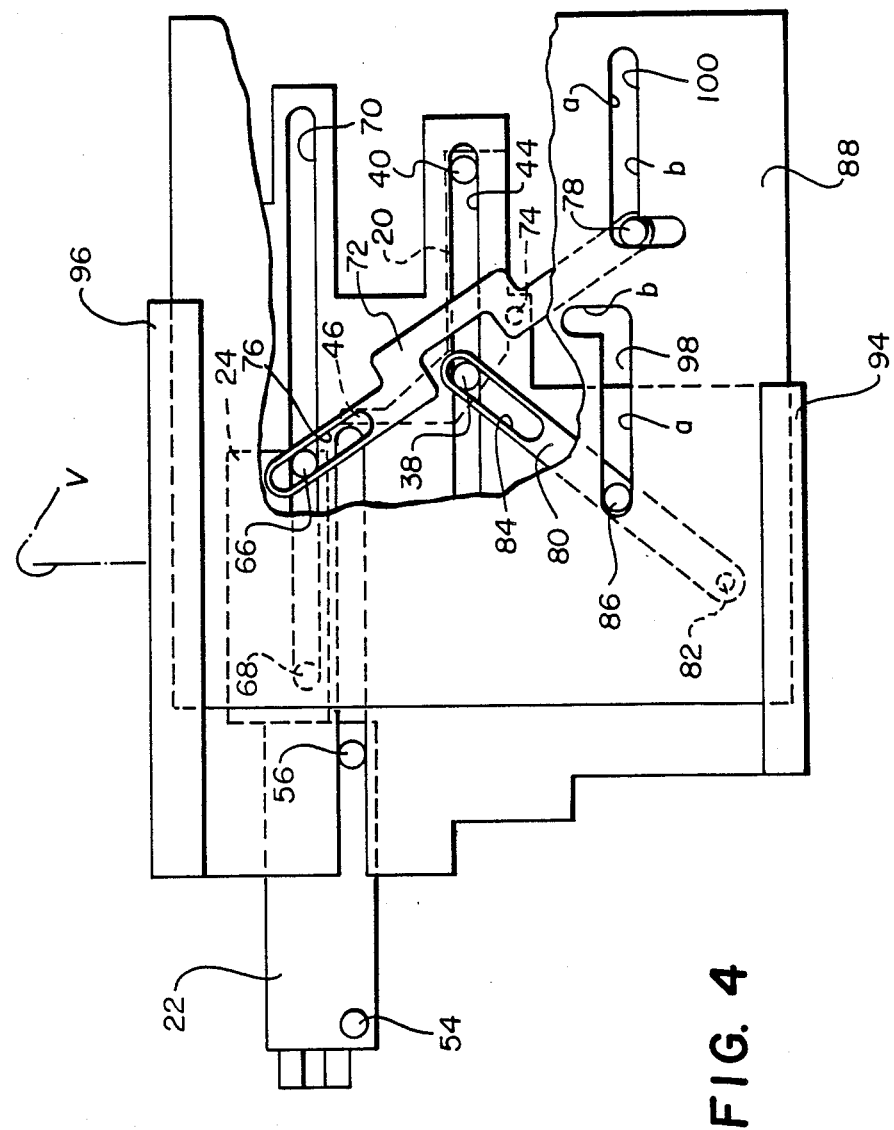

If the plate 88 is moved to the right from the position shown in FIGS. 1 and 2 to the position shown in FIG. 4, pin 78 will be moved into the cam portion (b) of slot 100 to pivot lever 72 counterclockwise. Such motion will cause lens frame 24 to be moved to the left into the viewing position. In this case, lens frame 24 will engage lens frame 22 and move it to the left out of the viewing position. No movement of lens frame 20 will occur because pin 86 will ride in the straight portion (a) of slot 98. Upon return of the plate to the position shown in FIGS. 1 and 2, the spring 59 will again return frame 22 to the viewing position.

It will now be apparent that the disclosed embodiment of the invention enables three lenses to be selectively positioned in a viewing position using simple rectilinear movements effected by a unique cam means. In addition, the assembly is compact and will have little effect on camera size.

While the invention has been shown and described with reference to a preferred embodiment thereof, it will be apparent that various changes may be made without departing from the scope of the invention as defined by the appended claims.

We claim:

1. Apparatus for selectively positioning one of a plurality of lenses into an optical path, said apparatus comprising:
    first, second and third lens frames each adapted to support a lens;
    means for supporting each of said frames for independent rectilinear movement between a first position where it is out of the optical path and a second position where it is in the optical path; and
    cam means for simultaneously moving one of said lens frames to its second position and the other of said frames to their first positions.

2. Apparatus as claimed in claim 1 wherein said cam means comprises pins extending from said frames and means for simultaneously moving said pins to position one of said frames to its second position and the other of said frames to their first positions.

3. Apparatus as claimed in claim 2 wherein said means for simultaneously moving said pins comprises a plate having three cam slots for receiving said cam pins respectively.

4. Apparatus as claimed in claim 3 wherein said plate has a central position wherein one of said frames is in the optical path and is moveable in one direction to a second position to position another frame in the optical path and in the opposite direction to a third position to position still another of said frames in the optical path.

5. Apparatus as claimed in claim 4 wherein said frames are positioned in substantially parallel planes and said supporting means comprises a structure for moveably supporting said frames in said parallel planes.

* * * * *

UNITED STATES PATENT AND TRADEMARK OFFICE
CERTIFICATE OF CORRECTION

PATENT NO. : 4,933,694

DATED : June 12, 1990

INVENTOR(S) : Richard A. Gates and Jeffrey R. Stoneham

It is certified that error appears in the above-identified patent and that said Letters Patent is hereby corrected as shown below:

Column 1, Line 9    After "abandoned" insert --and continued in U.S. Ser. No. 372,233, filed June 26, 1989, now U.S. Pat. No. 4,931,818

Signed and Sealed this

Tenth Day of September, 1991

Attest:

HARRY F. MANBECK, JR.

*Attesting Officer*    *Commissioner of Patents and Trademarks*